(12) United States Patent
Zhang

(10) Patent No.: US 10,585,309 B2
(45) Date of Patent: Mar. 10, 2020

(54) ELLIPSOID WIDE ANGLE BACKLIGHT LENS

(71) Applicant: SHENZHEN MINGZHI ULTRA PRECISION TECHNOLOGY CO., LTD., Shenzhen (CN)

(72) Inventor: Zhicai Zhang, Shenzhen (CN)

(73) Assignee: SHENZHEN MINGZHI ULTRA PRECISION TECHNOLOGY CO., LTD., Shenzhen (CN)

(*) Notice: Subject to any disclaimer, the term of this patent is extended or adjusted under 35 U.S.C. 154(b) by 0 days.

(21) Appl. No.: 16/377,264

(22) Filed: Apr. 8, 2019

(65) Prior Publication Data

US 2019/0235314 A1   Aug. 1, 2019

Related U.S. Application Data

(63) Continuation of application No. PCT/CN2017/073761, filed on Feb. 16, 2017.

(30) Foreign Application Priority Data

Nov. 23, 2016  (CN) .................... 2016 2 1258811 U
Nov. 23, 2016  (CN) .................... 2016 2 1258812 U

(51) Int. Cl.
   *G02F 1/1335*   (2006.01)
   *F21V 5/04*     (2006.01)
   (Continued)

(52) U.S. Cl.
   CPC .......... *G02F 1/133606* (2013.01); *F21V 5/04* (2013.01); *G02B 3/00* (2013.01);
   (Continued)

(58) Field of Classification Search
   CPC ................................................ G02F 1/133606
   See application file for complete search history.

(56) References Cited

U.S. PATENT DOCUMENTS

2006/0227431 A1* 10/2006 Yoon ...................... G02B 3/04
                                                                  359/708
2006/0238884 A1* 10/2006 Jang ......................... F21V 5/04
                                                                  359/653
(Continued)

FOREIGN PATENT DOCUMENTS

CN         1844967 B     11/2011
CN       104235756 A     12/2014
(Continued)

OTHER PUBLICATIONS

International Search Report for PCT/CN2017/073761.

*Primary Examiner* — Sang V Nguyen

(57) ABSTRACT

An ellipsoid wide angle backlight lens includes a lens body, the lens body being provided with a light exit top face, a light exit side face and a light reflection bottom face, the light exit side face being connected to the light exit top face and the light reflection bottom face, a light source mounting hole being arranged on a center of the light reflection bottom face, an inner wall of the light mounting hole being a light incident face, which being connected to the light reflection bottom face; wherein a light incident convex point is arranged at a top center of the light mounting hole, and surfaces of the light exit top face, the light incident face and the light incident convex point are all in an ellipsoid structure. The ellipsoid structure may reduce the number of used LED lamps and power consumption of a liquid crystal television.

5 Claims, 2 Drawing Sheets

(51) Int. Cl.
*G02B 3/00* (2006.01)
*G02B 27/09* (2006.01)
(52) U.S. Cl.
CPC ....... *G02B 27/0955* (2013.01); *G02F 1/1335* (2013.01); *G02F 1/133526* (2013.01); *G02F 1/133603* (2013.01); *G02F 2001/133607* (2013.01)

(56) References Cited

U.S. PATENT DOCUMENTS

| | | | | |
|---|---|---|---|---|
| 2008/0106902 A1* | 5/2008 | Peng | ................ | G02F 1/133603 362/299 |
| 2011/0284879 A1* | 11/2011 | Lin | ........................... | F21V 3/00 257/88 |
| 2015/0029728 A1* | 1/2015 | Hu | ........................... | F21V 5/04 362/311.02 |

FOREIGN PATENT DOCUMENTS

| | | | | |
|---|---|---|---|---|
| CN | 104317100 A | | 1/2015 | |
| CN | 204300975 U | | 4/2015 | |
| CN | 205079173 | * | 3/2016 | ............... F21V 5/04 |
| CN | 205079173 U | | 3/2016 | |

* cited by examiner

ELLIPSOID WIDE ANGLE BACKLIGHT LENS

CROSS-REFERENCE TO RELATED APPLICATIONS

This application is a continuation of International Patent Application No. PCT/CN2017/073761, with an international filing date of Feb. 16, 2017, designating the United States, now pending, which is based on Chinese Patent Applications No. 201621258811.2 and No. 201621258812.7, filed on Nov. 23, 2016. The contents of these specifications are incorporated herein by reference.

TECHNICAL FIELD

The present invention relates to the technical field of lens, and in particular, relates to an ellipsoid wide angle backlight lens.

BACKGROUND

A liquid crystal television generally employs a direct illumination-type LED backlight as a light emitting source at the rear of a liquid crystal panel. The direct illumination-type LED backlight is generally formed by an LED lamp and a lens. The lens may enable the LED light to irradiate light uniformly, such that the liquid crystal panel has a uniform luminance, and image quality of the liquid crystal television is further improved.

In the related art, the lens has a small light emitting angle, such that the LED lamp has a small irradiation area. As such, the direct illumination-type LED backlight has a small irradiation area against the liquid crystal panel. To increase the irradiation area of the LED backlight against the liquid crystal panel, manufacturers of the liquid crystal television generally employ a larger number of LED lamps. This, however, increases the manufacture cost, but also increases power consumption of the liquid crystal television.

In a Cartesian coordinate system, an ellipsoid has an equation of $x^2/a^2+y^2/b^2+z^2/c^2=1$, wherein a, b and c are a random positive constant, and a ratio of a to b to c determines a structure shape of the ellipsoid.

SUMMARY

To overcome the defect in the prior art, the present invention is intended to provide an ellipsoid wide angle backlight lens to increase an irradiation area of a direct illumination-type LED backlight against a liquid crystal panel and reduce the number of LED lamps and power consumption of the liquid crystal television.

The present invention employs the following technical solution:

An ellipsoid wide angle backlight lens includes a lens body, the lens body being provided with a light exit top face, a light exit side face and a light reflection bottom face, an upper edge and a lower edge of the light exit side face being respectively connected to an outer edge of the light exit top face and an outer edge of the light reflection bottom face, a light source mounting hole being arranged on a center of the light reflection bottom face, an inner wall of the light mounting hole being a light incident face, a lower edge of the light incident face being connected to an inner edge of the light reflection bottom face; wherein a light incident convex point protruding downwards is arranged at a top center of the light mounting hole, and surfaces of the light exit top face, the light incident face and the light incident convex point are all in an ellipsoid structure.

Further, X, Y and Z axes are set by using the center of the light reflection bottom face as an origin O of a Cartesian coordinate system; and the surfaces of the light exit top face, the light incident face and the light incident convex point have the following equations:

$$x_1^2/a_1^2+y_1^2/b_1^2+z_1^2/c_1^2=1,$$

$$x_2^2/a_2^2+y_2^2/b_2^2+z_2^2/c_2^2=1,$$

$$x_3^2/a_3^2+y_3^2/b_3^2+z_3^2/c_3^2=1,$$

wherein $a_1>b_1>c_1$, $c_2>b_2>a_2$, and $b_3>c_3>a_3$.

Further, any two or all of $a_1:b_1:c_1$, $c_2:b_2:a_2$ and $b_3:c_3:a_3$ are equal.

Further, $a_1>a_2>a_3$, $b_1>b_2>b_3$ and $c_1>c_2>c_3$.

Further, the light exit side face is a cylindrical face.

Further, the light exit side face and the light reflection bottom face are both provided with a sparking texture.

Further, the light reflection bottom face is provided with a mounting columnar leg and a mounting hole.

The following beneficial effects are achieved:

According to the present invention, (1) the light incident convex point is arranged, and the light penetrating through the lens body diverges by refraction, which prevents over-great luminance at the center of the lens body; (2) the ellipsoid structure may enable the light entering and exiting from the lens body to be refracted, such that an angle at which the light is emitted is even greater. In this way, an irradiation area of the LED backlight against a liquid crystal panel is greater, and thus the number of used LED lamps and power consumption of a liquid crystal television are both reduced; and (3) the sparking texture is used for treat the stray light, such that the lens projects or emits uniform light spots.

Figure 1:
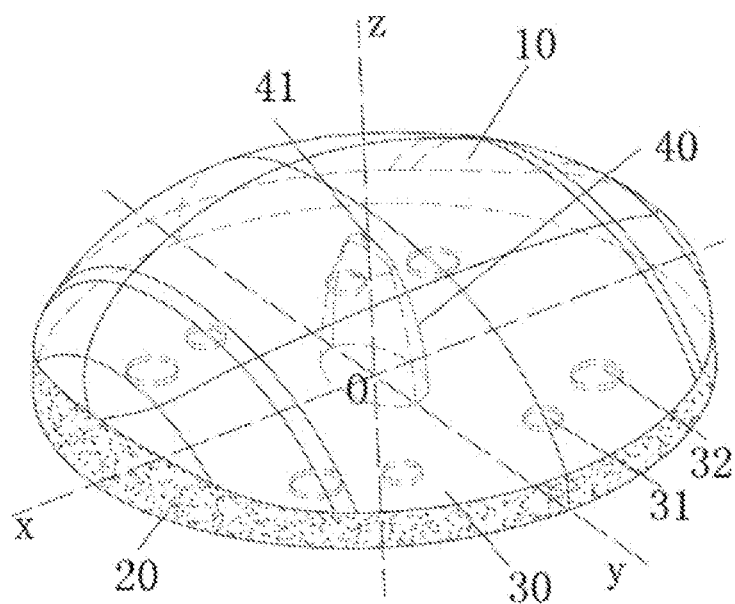
FIG. 1 is a perspective view of an ellipsoid wide angle backlight lens according to an embodiment of the present invention.

Reference numerals and denotations thereof:
10: light exit top face;
20: light exit side face;
30: light reflection bottom face;
31: mounting leg;
32: mounting hole;
40: light incident face;
41: light incident convex point;
A: lens body,
B: PCB board; and
C: LED lamp.

DETAILED DESCRIPTION

To make the objectives, technical solutions and advantages of the present invention clearer, hereinafter the present invention is further described in detail with reference to the accompanying drawings.

Figure 2:
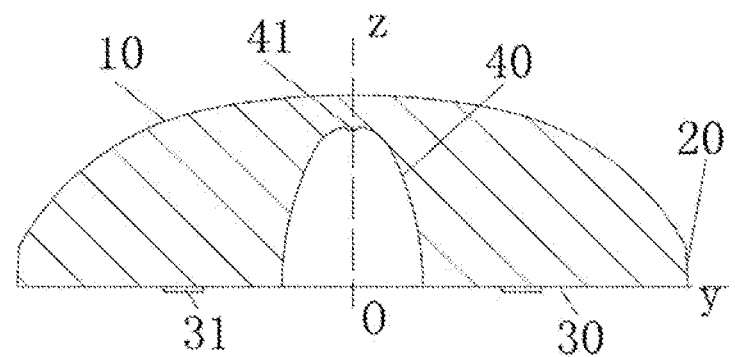
FIG. 2 is a sectional view taken on a plane ZOY.
Figure 3:
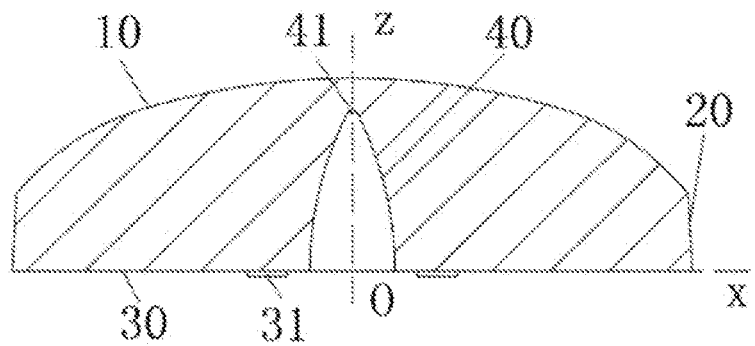
FIG. 3 is a sectional view taken on a plane ZOX.

As illustrated in FIGS. 1 to 3, an embodiment of the present invention provides an ellipsoid wide angle backlight lens. The ellipsoid wide angle backlight lens includes a lens body. The lens body is provided with a light exit top face 10, a light exit side face 20 and a light reflection bottom face 30. An upper edge and a lower edge of the light exit side face 20 are respectively connected to an outer edge of the light exit top face 10 and an outer edge of the light reflection bottom face 30. A light source mounting hole is arranged on a center of the light reflection bottom face 30. An inner wall of the light mounting hole is a light incident face 40. A lower edge of the light incident face 40 is connected to an inner edge of the light reflection bottom face 30. A light incident convex point 41 protruding downwards is arranged at a top center of the light mounting hole. Surfaces of the light exit top face 10, the light incident face 40 and the light incident convex point 41 are all in an ellipsoid structure.

X, Y and Z axes are set by using the center of the light reflection bottom face 30 as an origin O of a Cartesian coordinate system; and the surfaces of the light exit top face 10, the light incident face 40 and the light incident convex point 41 have the following equations:

$$x_1^2/a_1^2+y_1^2/b_1^2+z_1^2/c_1^2=1,$$

$$x_2^2/a_2^2+y_2^2/b_2^2+z_2^2/c_2^2=1,$$

$$x_3^2/a_3^2+y_3^2/b_3^2+z_3^2/c_3^2=1,$$

wherein $a_1>b_1>c_1$, $c_2>b_2>a_2$, and $b_3>c_3>a_3$; and
Further, $a_1>a_2>a_3$, $b_1>b_2>b_3$ and $c_1>c_2>c_3$.

Further, any two or all of $a_1:b_1:c_1$, $c_2:b_2:a_2$ and $b_3:c_3:a_3$ are equal. In this embodiment, preferably, $a_1:b_1:c_1=c_2:b_2:a_2=b_3:c_3:a_3$, such that refractive angles of a light when penetrating through surfaces of the light exit top face 10, the light incident face 40 and the light incident convex point 41 are consistent, and the light is uniformly distributed after being emitted from the lens.

The light exit side face 20 is a cylindrical face. The light exit side face 20 and the light reflection bottom face 30 are both provided with a sparking texture.

The light reflection bottom face 30 is provided with a mounting leg 31 and an mounting hole 32. The mounting leg 31 and the mounting hole 32 are symmetrically arranged with the X axis as a symmetric axis. The lens body is mounted on a PCB board via the mounting leg 31 and the mounting hole 32.

Figure 4:
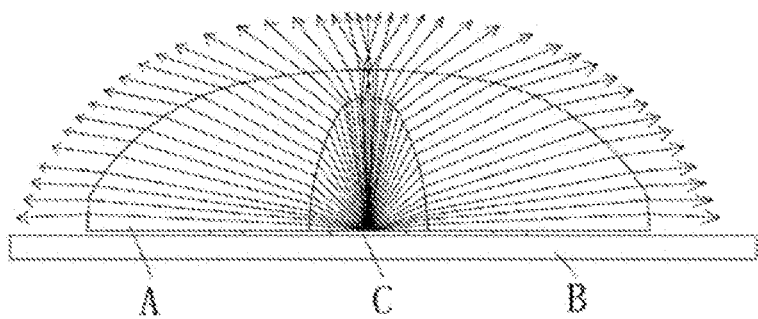
FIG. 4 is an optical path view on the plane ZOY when the ellipsoid wide angle backlight lens according to the embodiment of the present invention is used.
Figure 5:
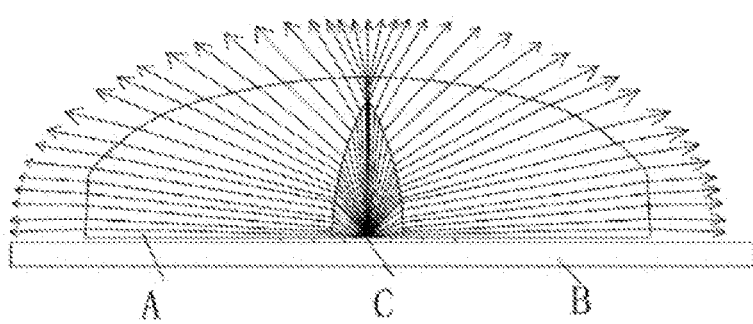
FIG. 5 is an optical path view on the plane ZOX when the ellipsoid wide angle backlight lens according to the embodiment of the present invention is used.

As illustrated in FIGS. 4 to 5, in use of the ellipsoid wide angle backlight lens according to this embodiment, a lens body A is mounted on a PCB board B, an LED lamp C is mounted at a center of a light source mounting hole of the lens body A, and a light diverges from the LED lamp C, is then refracted and reflected by the lens body A. and diverges from the lens body A.

In this embodiment, the light incident convex point 41 is arranged, and the light penetrating through the lens body diverges by refraction, which prevents over-great luminance at the center of the lens body. The ellipsoid structure may enable the light entering and exiting from the lens body to be refracted, such that an angle at which the light is emitted is even greater. In this way, an irradiation area of the LED backlight against a liquid crystal panel is greater, and thus the number of used LED lamps and power consumption of a liquid crystal television are both reduced. The sparking texture is used for treat the stray light, such that the lens projects or emits uniform light spots.

Disclosed above are merely preferred embodiments of the present invention, and are not intended to define the protection scope of the present invention. Any equivalent variations or replacements made based on the claims of the present invention shall fall within the protection scope of the present invention.

What is claimed is:

1. An ellipsoid wide angle backlight lens, comprising a lens body, the lens body being provided with a light exit top face, a light exit side face and a light reflection bottom face, an upper edge and a lower edge of the light exit side face being respectively connected to an outer edge of the light exit top face and an outer edge of the light reflection bottom face, a light source mounting hole being arranged on a center of the light reflection bottom face, an inner wall of the light mounting hole being a light incident face, a lower edge of the light incident face being connected to an inner edge of the light reflection bottom face; wherein a light incident convex point protruding downwards is arranged at a top center of the light mounting hole, and surfaces of the light exit top face, the light incident face and the light incident convex point are all in an ellipsoid structure, wherein X, Y and Z axes are set by using the center of the light reflection bottom face as an origin O of a Cartesian coordinate system; and the surfaces of the light exit top face, the light incident face and the light incident convex point have the following equations:

$$x_1^2/a_1^2+y_1^2/b_1^3+z_1^2/c_1^2=1,$$

$$x_2^2/a_2^2+y_2^2/b_2^2+z_2^2/c_2^2=1,$$

$$x_3^2/a_3^2+y_3^2/b_3^2+z_3^2/c_3^2=1;$$

wherein a1>b1>c1, c2>b2>a2 and b3>c3>a3, wherein a, b and c are a random positive constant, and a ratio of a to b to c determines a structure shape of the ellipsoid, wherein any two or all of a1:b1:c1, c2:b2:a2 and b3:c3:a3 are equal.

2. The ellipsoid wide angle backlight lens according to claim 1, wherein a1>a2>a3, b1>b2>b3 and c1>c2>c3.

3. The ellipsoid wide angle backlight lens according to claim 1, wherein the light exit side face is a cylindrical face.

4. The ellipsoid wide angle backlight lens according to claim 1 wherein the light exit side face and the light reflection bottom face are both provided with a sparking texture.

5. The ellipsoid wide angle backlight lens according to claim 1, wherein the light reflection bottom face is provided with a mounting columnar leg and a mounting hole.

* * * * *